United States Patent [19]
Kulczycki et al.

[11] 3,847,344
[45] Nov. 12, 1974

[54] TRACK FASTENER

[75] Inventors: Stanley N. Kulczycki, Redondo Beach; Edward E. Betts, Costa Mesa, both of Calif.

[73] Assignee: McDonnell Douglas Corporation, Santa Monica, Calif.

[22] Filed: Apr. 19, 1971

[21] Appl. No.: 134,986

[52] U.S. Cl............248/503, 24/221 R, 24/221 K, 105/464, 403/348
[51] Int. Cl....................... A44b 17/00, A62b 35/00
[58] Field of Search.......... 24/221 K, 206 R, 221 A; 105/366 D, 369 A; 248/361, 23, 361 R; 287/189.36 F; 16/129

[56] References Cited
UNITED STATES PATENTS

| | | | |
|---|---|---|---|
| 2,330,169 | 9/1943 | Churchill | 24/221 A |
| 2,390,325 | 12/1945 | Rapp | 24/221 A |
| 2,581,104 | 1/1952 | Houlsby | 16/129 |
| 2,589,028 | 3/1952 | Poupitch | 24/221 A |
| 2,615,194 | 10/1952 | Kreiner | 16/129 |
| 2,767,951 | 10/1956 | Cousino | 287/189.36 F |
| 3,019,472 | 2/1962 | Wasmuth | 16/129 |
| 3,124,993 | 3/1964 | Schlueter | 24/221 K |
| 3,136,017 | 6/1964 | Preziosi | 24/221 K |
| 3,159,393 | 12/1964 | Villano | 24/221 K |
| 3,171,182 | 3/1965 | Danehy | 24/221 K |
| 3,344,749 | 10/1967 | Bass | 248/361 R |
| 3,357,731 | 12/1967 | Piget | 287/189.36 F |
| 3,480,311 | 11/1969 | Lanham | 24/221 K |
| 3,488,815 | 1/1970 | Metz | 24/221 K |
| 3,595,176 | 7/1971 | Broling | 105/369 A |
| 3,620,171 | 11/1971 | Brenia | 105/369 A |
| 3,621,236 | 11/1971 | Hlinsky | 105/369 A |

FOREIGN PATENTS OR APPLICATIONS

| | | | |
|---|---|---|---|
| 703,967 | 2/1954 | Great Britain | 287/189.36 F |
| 1,806,424 | 10/1968 | Germany | 248/361 |

*Primary Examiner*—Bernard A. Gelak
*Attorney, Agent, or Firm*—G. L. Finch; W. J. Jason; D. L. Royer

[57] ABSTRACT

A fastener which can compensate for misalignment and tolerance build-up while assuring no looseness or rattle of the connection, for connecting structure, such as seats, partitions and cabinets to a track installed in an aircraft. The fastener includes a rotatable stud for locking the fastener down to the track, serrated engagement means for allowing substantial adjustment between the track and the connected structure, means to eliminate looseness between the track and the structure and means to maintain and indicate a locked condition of the fastener.

2 Claims, 4 Drawing Figures

PATENTED NOV 12 1974
3,847,344
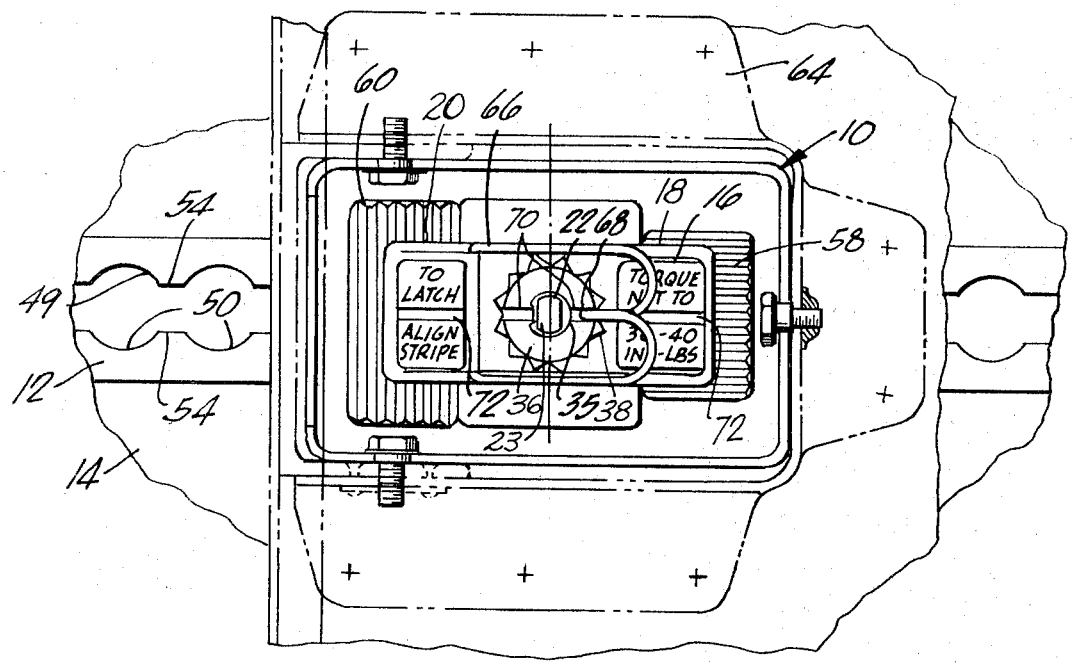
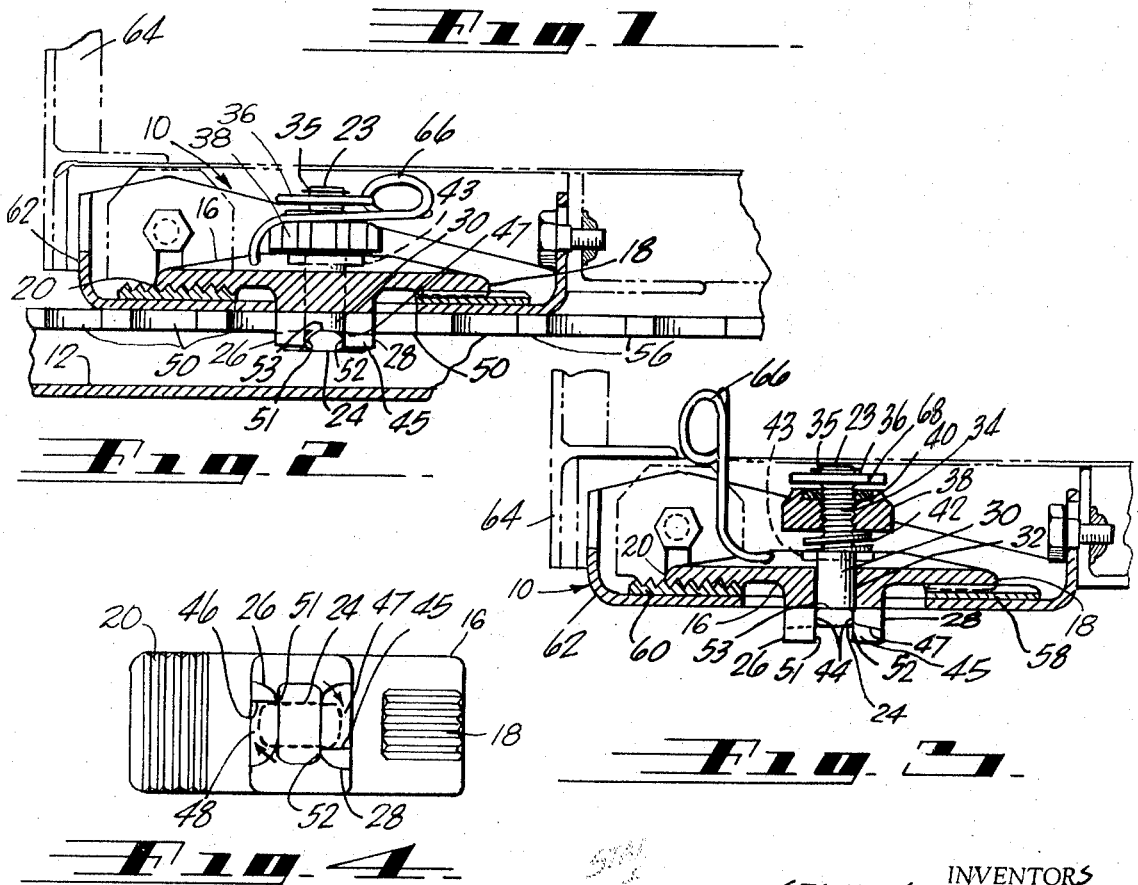
INVENTORS
STANLEY N. KULCZYCKI
EDWARD E BETTS
BY
George F Finch
-Attorney-

TRACK FASTENER

BACKGROUND OF THE INVENTION

Heretofore many cargo fittings have been known in the art for connecting various items to the standard attachment track found primarily in the floors of aircraft. An example of such fittings can be seen in BASS, et al, U.S. Pat. No. 3,344,749 which issued Oct. 3, 1967 and is assigned to applicants' assignee. Such fittings, while extremely successful when applied to tying down cargo, have not been able to meet the more stringent requirements placed on fittings for attaching movable partitions, seats and other similar devices to an attachment track. These requirements include positive locking to hold in all directions without backlash, the ability for longitudinal and lateral adjustment with respect to the anchoring point, and a low profile capable of being concealed within 1 inch of the floor panel.

SUMMARY OF THE INVENTION

The present fastener fulfills all of the above requirements and in addition has a large load capacity, a quick disconnect feature, a foolproof locking and safetying device visible at a glance for easy inspection, and an adjustable locking and tightening device that can be operated in one continuous and simple operation. The present fastener utilizes a stud assembly which, when twisted about a quarter turn, retains the fastener to the track. A safety wire is also provided to snap down over the upper end of the stud assembly to lock it in the track engaging position. The safety wire also provides a visual indication that the stud assembly is properly positioned and locked since the safety wire can be in the locking position only when the stud is in its track engaging position.

It is therefore an object of the present invention to provide a track fastener which enables longitudinal and lateral adjustment between the track and the anchored structure.

Another object of the present invention is to provide a low profile fastener.

Another object is to provide a fastener which can hold in all directions without backlash.

Another object is to provide a fastener with positive locking and safetying means which are visible at a glance.

Another object is to provide a fastener which can be adjusted, locked, and tightened in one continuous and simple operation.

These and other objects and advantages of the present invention will become apparent after considering the following detailed specification which covers a preferred embodiment thereof in conjunction with the accompanying drawing, wherein:

BRIEF DESCRIPTION OF THE DRAWING

FIG. 1 is a top plan view of a fastener employing the features of the present invention;

FIG. 2 is a partial cross-sectional side view of the fastener of FIG. 1 engaged with a track member;

FIG. 3 is a partial cross-sectional side view of the fastener of FIG. 1 in a disengaged condition; and FIG. 4 is a bottom view of the fastener of FIG. 1.

DETAILED DESCRIPTION OF THE SHOWN EMBODIMENT

Referring to the drawing more particularly by reference numbers, number 10 in FIG. 1 refers to a fastener for engaging a track 12 in an aircraft fuselage 14 or the like. The fastener 10 includes a base 16 having serrated end portions 18 and 20 and a stud assembly 22 which extends through the base 16.

The stud assembly 22 includes a shaft 23 having a T-shaped lower end portion 24 (shown in FIGS. 2, 3 and 4). The T-shaped portion 24 in combination with adjacent abutment portions 26 and 28 of the base 16 engage the track 12 to retain the fastener 10 at the desired location therealong, as shown in FIG. 2. The shaft 23 also includes a cylindrical portion 30 which passes through a hole 32 in the base 16, a threaded portion 34, and an upper end 35 including means to connect an indicating and locking disc 36 for rotation with the shaft 23. A nut 38 which includes a frictional insert 40, is positioned on the threaded portion 34 of the shaft 23. The frictional insert 40, which may be made from any suitable material such as nylon, is included so that torque applied to twist the nut 38 tends to rotate the shaft 23 and the disc 36 in the same direction as the nut 38.

The shaft 23 is spring biased upwardly by a spring 42 positioned between the nut 38 and an indentation 43 in the base 16. When the fastener 10 is in the disengaged condition, such as shown in FIG. 3 or the engaged position shown in FIG. 2, the biasing of the spring 42 can cause the T-shaped end portion 24 to retract into a groove 44 (FIG. 3) between the two abutment portions 26 and 28 of the base 16. The spring 42 in combination with the groove 44 therefore cause the fastener 10 to be self-locking in that the slight upward movement of the end portion 24 can prevent accidental rotation of the end portion 24 to a disengaged position. In addition, the slight upward movement of the end portion 24 causes a slight snap which enables the engagement or disengagement thereof to be sensed.

When it is desired to connect the fastener 10 to the track 12, the stud shaft 23 is pushed downwardly and rotated until it moves from the angular position shown in solid outline in FIG. 4 to the position shown in dotted outline where the T-shaped end 24 engages upstanding abutment surfaces 45 and 46 and rests on surfaces 47 and 48, all of which are formed on the base 16. The T-shaped end 24 and the two abutment portions 26 and 28 can then be placed down into the cutout portion 49 of the track 12. When this happens, the abutment portions 26 and 28 come in contact with adjacent semicircular cutout portions 50 of the cutout 49. Suitable means, such as a wrench, are then applied to the nut 38 to torque the shaft 23 in an upward direction. Since the nut 38 includes the frictional insert 40, the shaft 23 tends to rotate with the nut 38 thereby causing the T-shaped portion 24 of the shaft 23 to move from the position shown in dotted outline in FIG. 4 to the position shown in FIG. 2 and in solid outline in FIG. 4. At this position, the T-shaped portion 24 engages extended abutment surfaces 51 and 52 of the groove 44 and the underside 53 of the T-shaped portion 24 engages the intermediate section 54 between the semicircular sections 50 of the track cutout 49. The fastener 10 is thereby restricted from lateral movement by the abutment portions 26 and 28 which extend down into the track 12 and from vertical movement by the interaction between the T-shaped portion of 24 of the shaft 23 and the intermediate section 54 of the track 12. The nut 38 is tightened until a predetermined torque resistance is reached. This causes the underside 53 of the T-shaped portion 24 to apply force upwardly against the underside 56 of the track 12 which, of course, draws the fastener 10 down toward the track 12.

When the fastener 10 is drawn down to the track 12, the serrated end portions 18 and 20 of the base 16 are forced down into engagement with mating serrations 58 and 60 on a pan member 62 which is normally connected to the structure 64 to be fastened to the track 12. The serrated portion 20 and the serrations 60 run at 90° to the serrated portion 18 and the serrations 58 so that the pan member 62 and the attached structure 64 can be misaligned both laterally and longitudinally from the track 12 and still be firmly fastened thereto by the fastener 10.

The fastener 10 can also include locking means such as the locking wire 66 which can swing from an unlocked position shown in FIG. 3, to the locked position shown in FIG. 2. The locking wire 66 is pivoted to the base 16 of the fastener 10 and can only be rotated and snapped into its locking position when the disc 36, attached to the stud assembly shaft 23, is in a position which indicates that the T-shaped portion 24 of the stud assembly 22 is in its track engaging position. This is because the disc 36 includes a groove 68 which allows the wire 66 to snappingly engage therewith only when the disc 36 is in the locked orientation shown in FIGS. 1 and 2. The locking wire 66 is normally snapped down over the disc 36 after the torquing operation of the nut 38 has been completed. The locking wire 66 enables personnel to perform a quick visual check from the side of the fastener 10 to assure that it is in a locked and engaged position. In addition, the wire 66 assures that the fastener 10 remains in the locked position. Other visual means such as a painted stripe 70 on the disc 36 which aligns with similar painted stripes 72 on the base 16 can be included to provide an additional visual indication that the fastener 10 is in its engaged position.

Thus, there has been shown and described novel fastener means which fulfill all of the objects and advantages sought therefor. Many changes, modifications, variations, and other uses and applications of the subject invention will, however, become apparent to those skilled in the art after considering this specification together with the accompanying drawing. All such changes, modifications, variations and other uses and applications which do not depart from the spirit and scope of the invention are deemed to be covered by the invention which is limited only by the claims which follow:

What is claimed is:

1. A fastener for use with a track in a supporting structure to secure removable structure to the supporting structure, said fastener comprising:
   a base including abutment means adapted to engage the track to restrain said fastener from movement in a planar direction, and connection means adapted to connect the removable structure to said fastener;
   a stud assembly including a rotatable shaft which extends through said base, said shaft including a lower T-shaped integral end portion adapted to predeterminately engage with the track to fix said fastener from movement at a right angle to said planar direction when said rotatable shaft is rotated a predetermined angle in a predetermined direction, a threaded portion adapted to draw said T-shaped end portion into tight engagement with the track and means to indicate said T-shaped end portion is predeterminately engaged with the track, said connector means including a connector member, said connector being adapted for fastening to the removable structure and having a first serrated connector portion oriented in a first direction and a second serrated connector portion oriented in a second direction, said connector defining an opening between said first and second serrated connector portions through which said T-shaped end portion and said base abutment means extend, a first serrated portion of said base oriented in said first direction, and a second serrated portion of said base oriented in said second direction whereby said first and second serrated portions mate with said first and second serrated connector portions of said connector member to retain and enable adjustment of the removable structure in said planar direction with respect to the supporting structure; and
   means threadably engaging said threaded shaft portion and bearing against said base so that when said threadably engaging means are twisted in the predetermined direction and the predetermined angle to engage said T-shaped end portion with the track, said threaded shaft portion draws said T-shaped end portion into tight engagement with the track.

2. The fastener defined in claim 1 wherein said threadably engaging means include:
   frictional means which frictionally engage said threaded shaft portion so said shaft and said T-shaped end portion thereof tend to rotate with said threadably engaging means, said T-shaped end portion being rotatable in a predetermined arc, and engaging the track when rotated said predetermined arc in said predetermined direction.

* * * * *